United States Patent [19]

Tenma et al.

[11] Patent Number: 4,947,322
[45] Date of Patent: Aug. 7, 1990

[54] METHOD OF MANAGING LAYOUT OF GOODS

[75] Inventors: Tadashi Tenma, Sagamihara; Kichizo Akashi, Ebina; Tetsuo Kusuzaki, Kawasaki; Shouji Igeta, Yokohama; Isao Tsushima, Yamato; Norihisa Komoda, Kawasaki, all of Japan

[73] Assignee: Hitachi, Ltd., Tokyo, Japan

[21] Appl. No.: 183,669

[22] Filed: Apr. 19, 1988

[30] Foreign Application Priority Data

Apr. 20, 1987 [JP] Japan ................................ 62-95108
Jul. 17, 1987 [JP] Japan ............................... 62-176996

[51] Int. Cl.$^5$ ............................................. G06F 15/21
[52] U.S. Cl. ............................. 364/401; 340/825.28; 434/72
[58] Field of Search ................... 340/825.28; 235/376, 235/383, 385; 364/401, 402, 403, 513; 434/72

[56] References Cited

U.S. PATENT DOCUMENTS

| | | | |
|---|---|---|---|
| 4,112,598 | 9/1978 | Maass et al. | 434/430 |
| 4,639,875 | 1/1987 | Abraham et al. | 364/403 X |
| 4,642,780 | 2/1987 | Thomson | 434/72 |
| 4,654,800 | 3/1987 | Hayashi et al. | 364/403 X |
| 4,700,317 | 10/1987 | Watanabe et al. | 364/488 |
| 4,783,740 | 11/1988 | Ishizawa et al. | 364/403 |
| 4,797,819 | 1/1989 | Dechirot | 364/403 |

Primary Examiner—Jerry Smith
Assistant Examiner—Steven Kibby
Attorney, Agent, or Firm—Antonelli, Terry, Stout & Kraus

[57] ABSTRACT

A goods layout planning method for making a layout for a quantity of goods arranged on gondolas in a store by using a terminal device including a display and a processor. Rules regarding goods layouts are stored in a knowledge base. The effort to make layout plans for goods can be simplified and the efficiency thereof improved by using sales data for each of the goods, attributes of goods, attributes of gondolas, and the rules with respect to the goods layouts.

10 Claims, 13 Drawing Sheets

GONDOLA INFORMATION — 42

| IDENTI-FICATION | SIZE | | | LAYOUT | | |
|---|---|---|---|---|---|---|
| | LENGTH | WIDTH | HEIGHT | X | Y | DIRECTION LENGTH |
| a | 400 | 1500 | 2000 | 1000 | 2000 | |
| b | | | | | | |
| c | | | | | | |

STORE INFORMATION — 41

| IDENTI-FICATION | LENGTH (SIZE) | WIDTH (SIZE) | POINTER |
|---|---|---|---|
| AAA | 10000 | 20000 | 1 |
| BBB | 20000 | 10000 | 50 |

FIG. 4

SALE INFORMATION — 62

| IDENTI-FICATION | SIZE OF GOODS | | | UNIT PRICE | QUANTITY OF GOODS SOLD |
|---|---|---|---|---|---|
| | LENGTH | WIDTH | HEIGHT | | |
| G1 | 100 | 50 | 150 | 200 | 600 |
| G2 | | | | | |
| G3 | | | | | |

— 61

| NAME | POINTER |
|---|---|
| a | 1 |
| b | 61 |

| GOODS | KIND | MAKER | USE | SALE |
|---|---|---|---|---|
| G₁ | SHAMPOO | PRIVATE BRAND | VARIOUS USES | SALE |
| G₂ | SHAMPOO | NATIONAL- BRAND | VARIOUS USES | NON-SALE |
| G₃ | | | | |

FIG. 12

```
(1) IF (GOODS A AND GOODS B ARE THE SAME CATEGORY)
       (GOODS A ARE PRIVATE-BRAND GOODS)
       (GOODS B ARE NOT PRIVATE-BRAND GOODS)
    THEN (ADD 1 FROM NUMBER OF GOODS A)
         (DELETE 1 FROM NUMBER OF GOODS B)

(2) IF (GOODS A ARE SALE GOODS)
       (GOODS A AND GOODS B ARE THE SAME CATEGORY)
    THEN (ADD 2 TO NUMBER OF GOODS A)
         (DELETE 1 FROM NUMBER OF GOODS B)
```

FIG. 14

Table 110 — Attribute of 1st Shelf / ... / Attribute of n Shelf:

| IDENTIFICATION OF GONDOLA | IDENTIFICATION OF SHELF | SHELF HEIGHT FROM FLOOR | SIZE | | | ... | IDENTIFICATION OF SHELF | SHELF HEIGHT FROM FLOOR | SIZE | | |
|---|---|---|---|---|---|---|---|---|---|---|---|
| | | | DEPTH | WIDTH | HEIGHT | | | | DEPTH | WIDTH | HEIGHT |
| T1 | t1 | 0 | 300 | 1500 | 500 | ... | tn | 1300 | 300 | 1500 | 300 |

Table 1102:

| IDENTIFICATION OF GOODS | SIZE | | | WEIGHT | SHELF SPACE SIZE | | | NAME OF SHELF |
|---|---|---|---|---|---|---|---|---|
| | DEPTH | WIDTH | HEIGHT | | DEPTH | WIDTH | HEIGHT | |
| S1 | 100 | 150 | 100 | 100 | 2 | 2 | 3 | t1 |
| S2 | | | | | | | | |

| IDENTI-FICA-TION OF GOODS | SIZE | | | WEIGHT | SHELF SPACE SIZE | | | IDENTI-FICA-TION OF SHELF |
|---|---|---|---|---|---|---|---|---|
| | DEPTH | WIDTH | HEIGHT | | DEPTH | WIDTH | HEIGHT | |
| $S_0$ | 150 | 200 | 100 | 100 | 2 | 2 | 2 | $t_2$ |

| GOODS | WHOLESALE COST | SALES PRICE | SALES NUMBER |
|---|---|---|---|
| $S_1$ | 200 | 300 | 20 |
| $S_2$ | 150 | 250 | 50 |

METHOD OF MANAGING LAYOUT OF GOODS

BACKGROUND OF THE INVENTION

The present invention relates to a system and a method for control of goods in a store such as a supermarket, a convenience store, or the like, in which goods are arranged on gondolas and sold.

A number of systems for determining the layout of goods on gondolas have been proposed. These systems lay out each of the goods on a specific shelf, output a list of the sales of each of the goods; automatically determine the number of goods on each gondola on the basis of the original layout of goods and the sales of the goods; and modify the layout of goods in an interactive manner with the planner who planned the layout of the goods. See for example, the Goods Catalogue, "SPACE-MATE, Merchandising Activate Support System", Nippon Electric Co., Ltd.

According to the automatic determining function of the foregoing conventional systems, nothing is considered with respect to the rearrangement of the positions of each of the goods and a new layout of goods on the shelves. In addition, with regard to an increase or decrease in the available quantity, nothing is considered as to how to effectively use the planner's knowledge about the layout of goods. For instance, the planner may want to arrange more goods of a private-brand than goods of a national-brand. Likewise, since certain goods are strategic goods, the planner may not want to reduce the available number although sales are low. There is no mechanism to utilize this know-how in an interactive manner on the basis of the judgment of the planner. Therefore, there are the following problems.

(1) A large number of possible plans exist for making available goods, and so obtaining the optimum layout of the goods requires much labor.

(2) Since the number of kinds of goods is large, the know-how of the planner cannot be effectively used for all of the goods. Therefore, a satisfactory layout of the goods cannot be always provided.

(3) The layout of the goods depends on the ability of the planner, and so satisfactory layout of the goods cannot be always determined.

SUMMARY OF THE INVENTION

It is an object of the present invention to provide a system for controlling the availability of goods in which any planner can provide a satisfactory layout of goods in a short time.

To accomplish this object, there are provided: a display device; a display position indicating device such as a mouse, a light pen, or the like to designate a display position on the display device; an input device such as a keyboard; a processor having a man-machine interactive function; a memory device; and a knowledge base regarding the layout of goods.

1. The planner displays the layout of gondolas in a store and the sales from each gondola on the display device. On the basis of the display, the planner determines gondolas whose layout of goods should be changed and then designates changes by using a mouse or the like.

2. On the basis of a designated gondola identification, the sales of each of the goods on a gondola are displayed on the display device. On the basis of the sales of each of the goods, the planner decides the kind of unsold goods to be deleted and the kind of goods to be newly added.

3. The kind of goods to be added and rules about decisions as to the quantity of goods in the knowledge base are inputted, and the quantity of goods to be added is determined by the processor on the basis of the input data.

4. The layout of each of the goods is automatically determined on the basis of the quantity of goods determined to be added and the rules regarding the layout of the goods in the knowledge base. The layout of the goods, which was automatically determined, is displayed on the display device. Also, the planner can modify in an interactive manner the layout of the goods which was automatically determined and displayed on the display device. The automatic decision and modification of the layout of the goods are repeated until a satisfactory layout of the goods is obtained.

According to the invention, the quantity of goods to be added and the gondola onto which the goods are to be added are determined by the processor on the basis of the rules in the knowledge base. Therefore, the planner does not need advanced knowledge and technique regarding the layout of goods. In addition, if the layout of the goods which was automatically determined is not satisfactory (when the rules in the data base are incomplete), a satisfactory layout can be derived by interactive modification by the planner.

The above-mentioned and other features and objects of this invention will become more apparent by reference to the following description taken in conjunction with the accompanying drawings.

DESCRIPTION OF THE PREFERRED EMBODIMENTS

Figure 1:
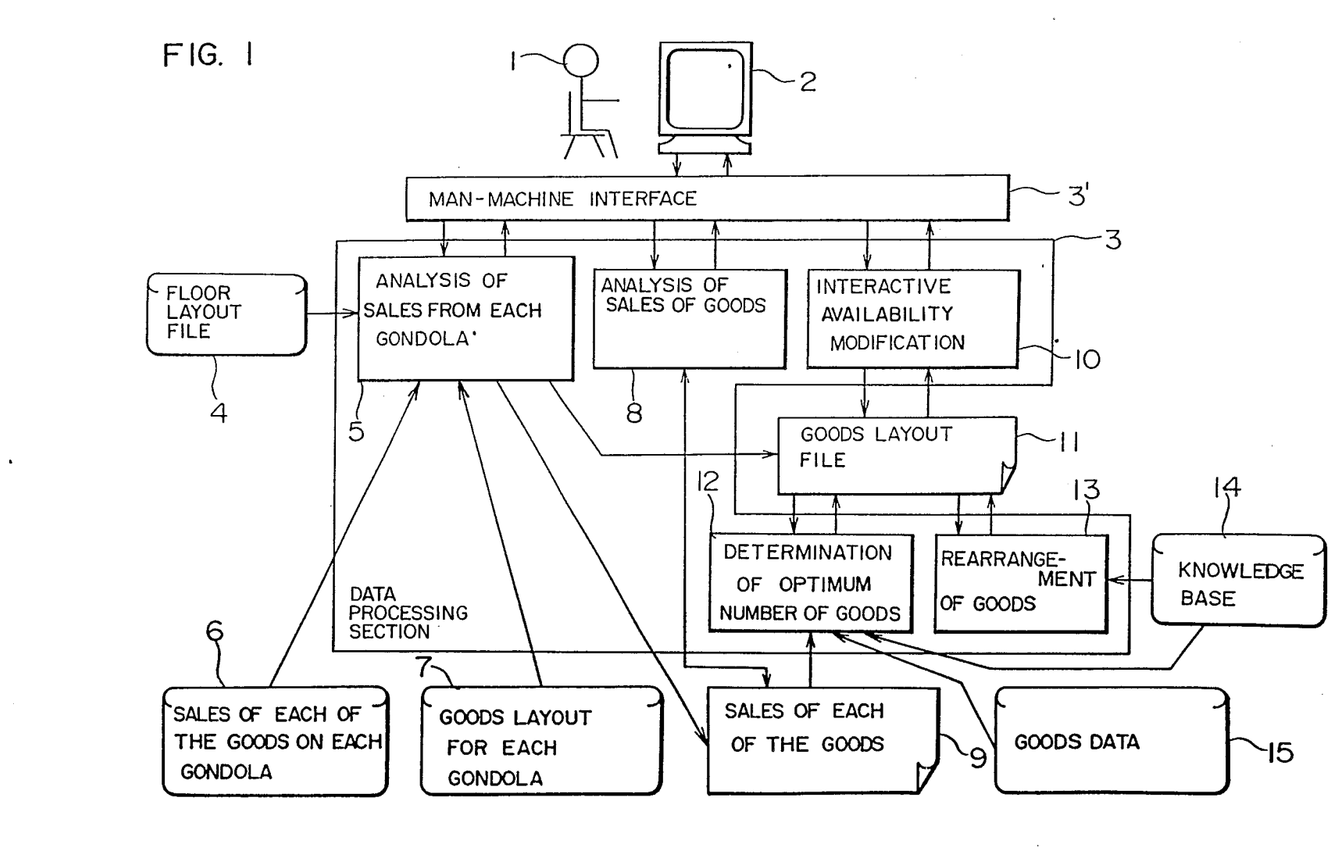
FIG. 1 is a block diagram showing a data processing apparatus which is used when performing a method of managing a layout of goods according to the present invention.

FIG. 1 shows an embodiment of a data processing system which is used in performing a method according to the present invention;

A planner who plans a layout of goods, i.e., a user 1 of the data processing system, executes processes in an interactive manner with a data processor, such as a microcomputer or the like, through a terminal device 2 including a display device, a keyboard, and a pointing device, such as a mouse, a light pen, or the like, to designate a display position on a screen of the display device.

The data processor is provided with a man-machine interface section 3' and a data processing section 3 having: a file 5 of the sales from each gondola; a file 8 of the sales of each kind of the goods; a file 12 of the optimum number of goods; a file 13 to automatically determine the layout of goods; and a file 10 to modify the layout of goods in an interactive manner.

Further, the data processing system comprises: a floor layout file 4 in which information about the layout of the gondolas in a store is stored; a sales file 6 in which sales data about the sales of each of the goods on each gondola is stored; a goods layout file 7 in which information about the layout of the goods on each gondola is stored; a goods data file 15 in which information regarding the characteristics of each of the goods is stored; a knowledge base 14 which stores rules about the goods; goods layout file 11; and a table 9 for sales of each of the goods. These files and tables are formed in a memory device.

Figure 2:
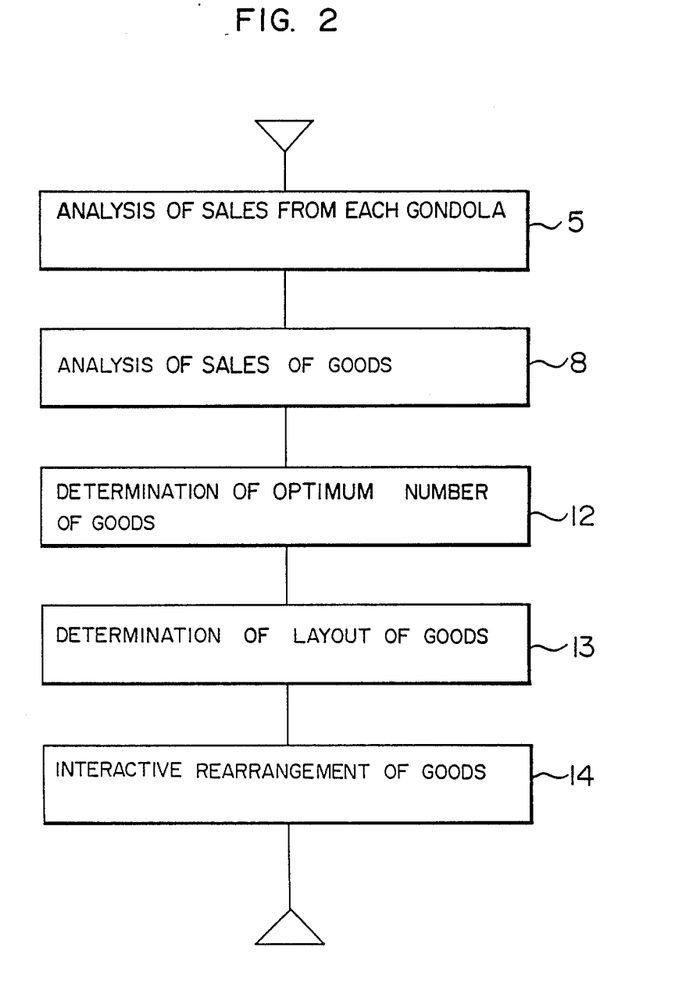
FIG. 2 is a flowchart showing steps in an embodiment of the managing method for the layout of goods according to the invention.

FIG. 2 shows steps in an embodiment of a managing method for the layout of goods according to the invention. The operation of each step will now be described hereinbelow in accordance with the respective steps.

(1) Analysis of sales from each gondola:

In this step, the sales from each gondola are outputted to the display device of the terminal device 2 on the basis of information in the floor layout file 4, the file 6 in which the information regarding the sales of each of the goods and each gondola is stored, and file 7 in which the information regarding the layout of goods on each gondola is stored.

Figure 3:
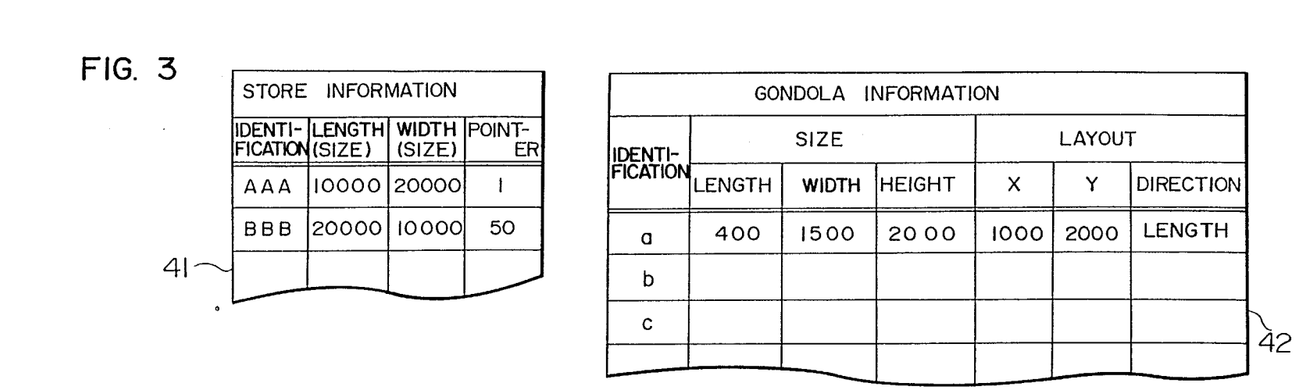
FIG. 3 is a diagram showing the contents of a floor layout file 4 in FIG. 1.

The contents of the floor layout file 4 are shown in FIG. 3. Store information 41 and gondola information 42 are stored in the file 4. The store information 41 comprises: a store identification; the length and width of the floor of the store; and a pointer to the gondola information 42 assigned to this store. The gondola information 42 comprises: the identification of the gondola; the length, width, and height of the gondola; and layout information about the gondola. Assuming that the length direction of the store is set to an X axis and the width direction of the store is set to a Y axis, the layout information of the gondola consists of coordinates (X, Y) where the gondola is arranged and the layout direction of the gondola with respect to whether the gondola is arranged in the length direction of the store or in the width direction.

Figure 4:
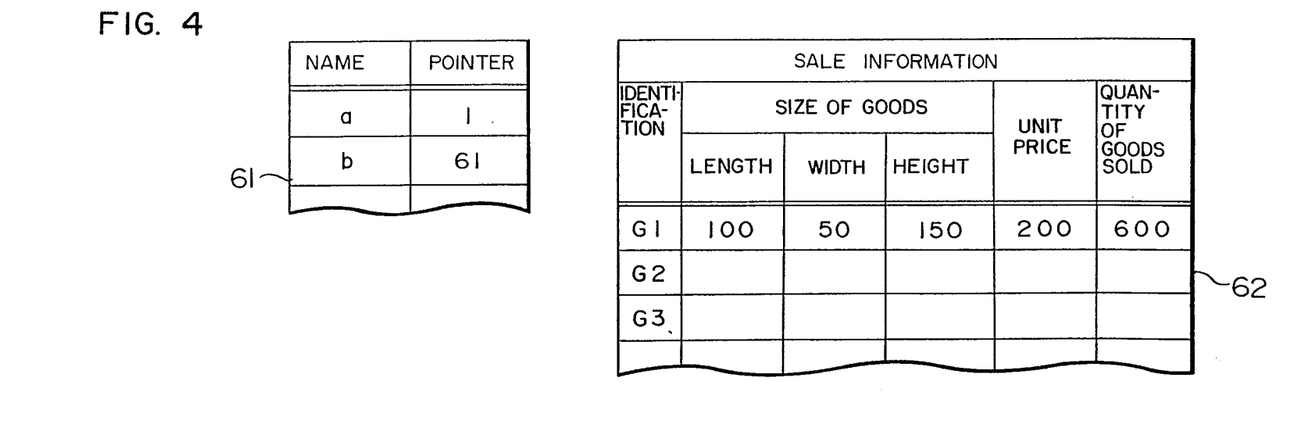
FIG. 4 is a diagram showing the contents of a sales file 6 in FIG. 1.

FIG. 4 shows the contents of the file 6 of sales data for each of the goods on each gondola. This file comprises gondola information 61 and sales information 62. The gondola information 61 consists of a gondola identification and a pointer to the sales information 62 of the goods arranged on this gondola. The sales information 62 consists of identifications, sizes, unit prices, and quantity of goods sold from each gondola.

Figure 5:
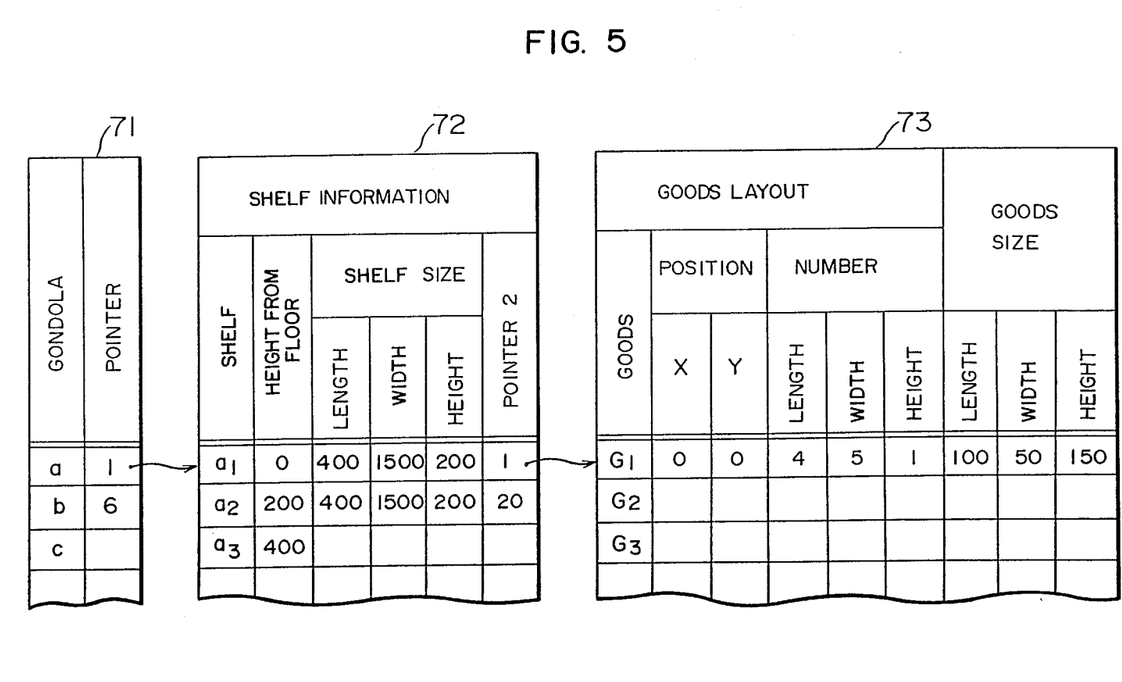
FIG. 5 is a diagram showing the contents of a file 7 of a goods layout for each gondola in FIG. 1.

FIG. 5 shows the contents of file 7 for layout of goods on each gondola. The file 7 comprises: gondola information 71; shelf information 72; and goods information 73. The gondola information 71 consists of a gondola identification and a pointer to the shelf information 72 for the gondola. The shelf information 72 consists of the identification of each shelf, the height from the floor surface of the shelf, the size of the shelf, and a pointer to the goods information 73 for the goods arranged on the shelf. The goods information 73 consists of the identification of the goods arranged on each shelf, the arrangement position (X, Y) based on the assumption that the left front edge of the shelf is an origin (0, 0), and the length direction is an X axis, and the width direction is a Y axis, the quantities of goods in the directions of length, width, and height, and the sizes of goods.

Figure 6:
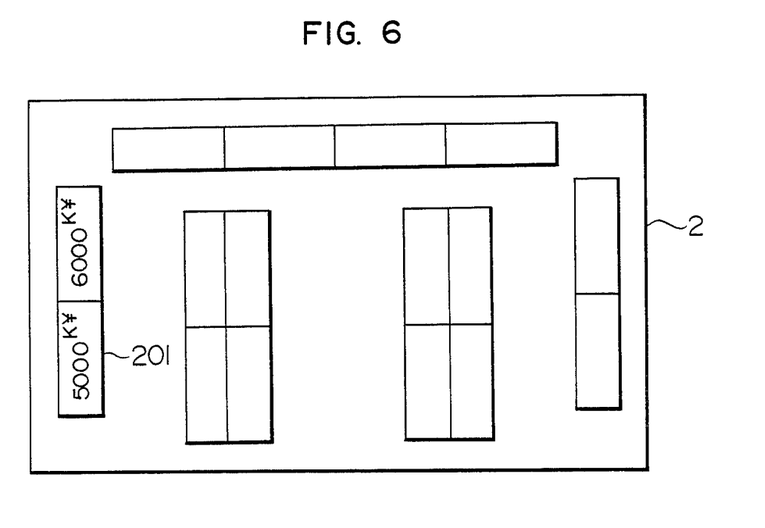
FIGS. 6, 7, and 8 are, respectively, a display of a floor layout, a display of sales data for goods, and a display of a table of the optimum number of goods, which displays are displayed on a screen of a display device in FIG. 1.

In step 5, on the basis of the information in the three files 4, 6, and 7, a floor layout as shown in FIG. 6 is displayed on the terminal device 2. A value written on a gondola 201 indicates the total amount of sales of goods from gondola 201. In this step, the total amount of sales is displayed for each gondola.

The planner 1 designates a gondola whose layout of goods should be modified on the floor 5 layout shown in FIG. 6 by using the mouse.

Further, the goods layout of the gondola designated by the planner 1 is stored in the goods layout table 11 in the same format as that shown in FIG. 5. Moreover, the sales of each of the goods is also stored in table 9 for the sales of each of the goods in the same format as that shown in FIG. 4.

Figure 7:
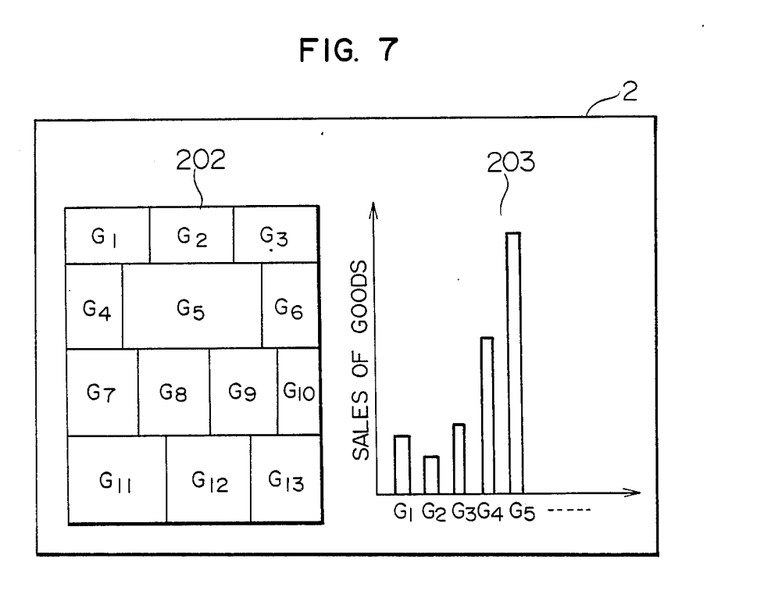

(2) Analysis of sale of each of the goods:

In step 8, on the basis of information from goods layout table 11 and table 9 for the sales of each of the goods, goods layout 202 and sales 203 of each of the goods on the gondola designated in Step 5 are displayed on the terminal device 2, as shown in FIG. 7.

The planner 1 analyzed the displayed result. If goods are selected to be deleted, the planner 1 designates them by using the mouse.

(3) Determination of the optimum number of goods:

In step 12, on the basis of information from goods layout table 11 and table 9 for the sales of each of the goods, the number of each of the goods is determined in a manner such as to optimize the sales efficiency of the goods.

Figure 8:
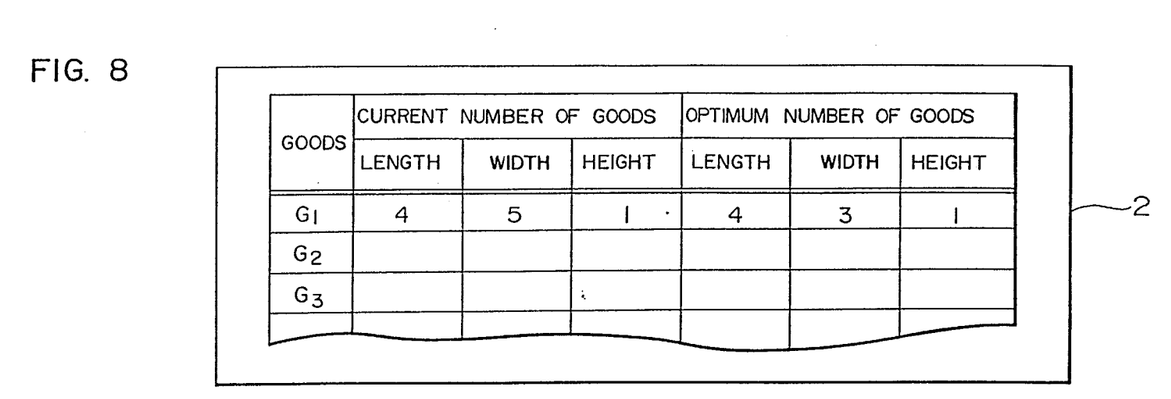
Figure 11:
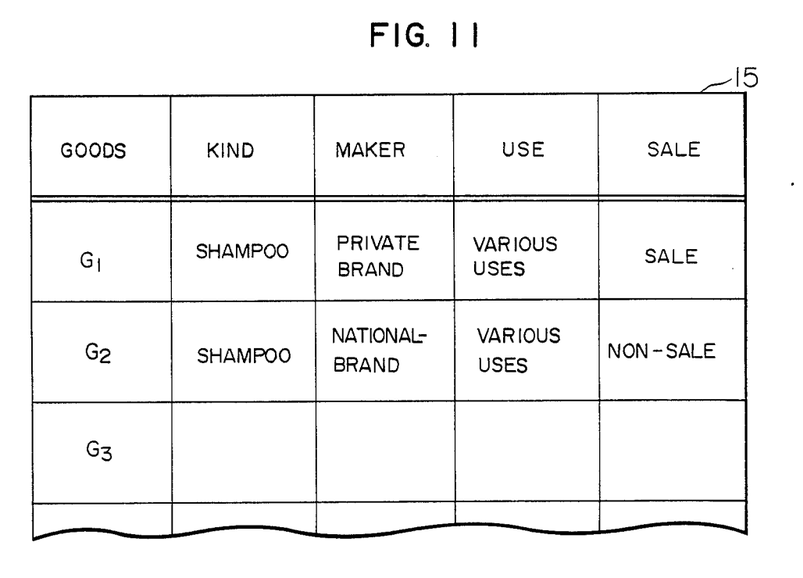
FIG. 11 is a diagram showing the contents of goods data file 15 in FIG. 1.
Figure 12:
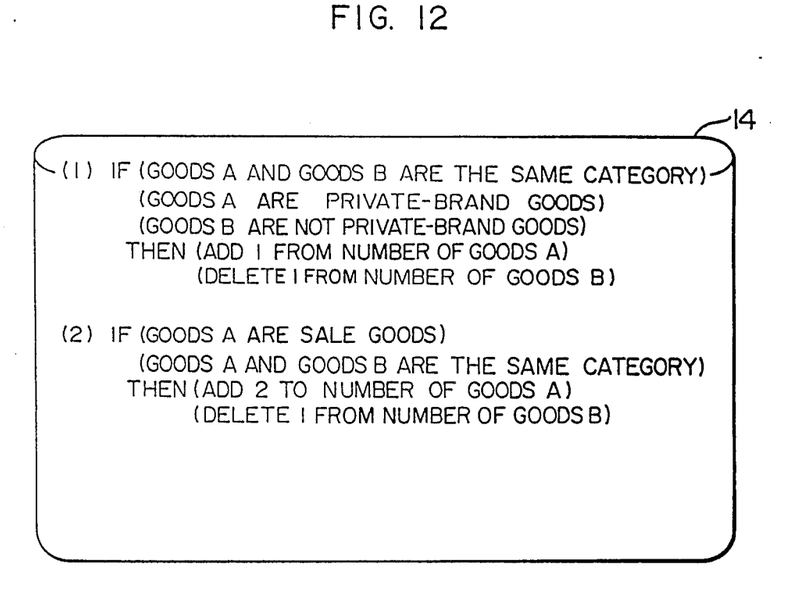
FIG. 12 is a diagram showing an example of the rules for modification of goods in the knowledge base in FIG. 14.

Next, on the basis of the quantity of goods and attributes of each of the goods stored in the goods data file 15, the quantity of each of the goods is changed by using rules from the knowledge base 14. A table 204, shown in FIG. 8, for the optimum quantities of goods is displayed on the display of terminal device 2. FIG. 11 shows a layout of the goods data file 15. FIG. 12 shows rules for modification of the quantities of goods stored in the knowledge base 14.

Figure 9:
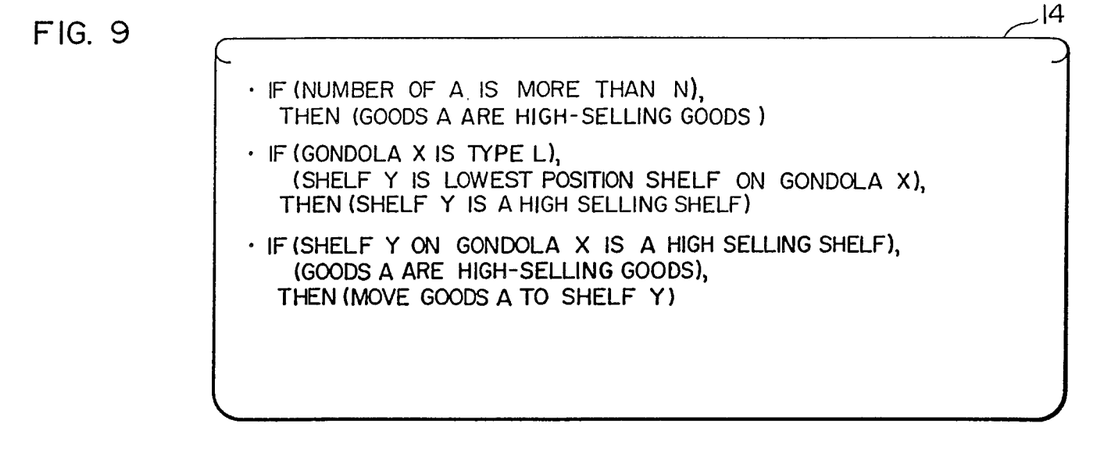
FIG. 9 is a diagram showing a part of the contents of a knowledge base in FIG. 1.
Figure 10:
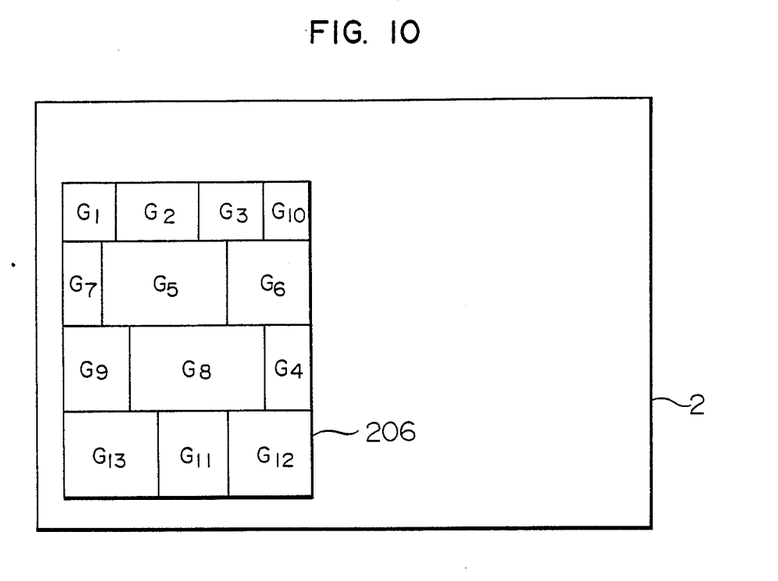
FIG. 10 is a diagram showing the result of the layout of goods which is automatically determined and displayed on the display device in FIG. 1.

(4) Automatic determination of layout of goods:

In step 13, on the basis of the rules stored in the knowledge base 14 and the information about the goods in layout table 11, a new layout of goods is determined. FIG. 9 shows a layout of the knowledge base 14. In this case, the rules are described in an IF/THEN form and stored. In step 13, the layout plan regarding on which shelf the goods should be arranged is determined by using this rule. The layout of each of the goods is determined on the basis of the layout plan by using the algorithm to determine the goods layout on a two-dimensional plane. By repeating this operation, the layout of all of the goods is determined. A goods layout 206, generated as the result of the determination, is displayed on the terminal device 2 in a format as shown in FIG. 10.

(5) Interactive modification of goods layout:

Step 14 permits the planner to modify the goods layout (shown in FIG. 10) which was automatically determined. In this case, the modification includes various functions for deletion, addition, exchange, movement, and change of the goods. Each function can be executed by pressing the function keys on the keyboard provided for the terminal device 2. The planner 1 depresses a desired function key and thereafter designates the goods to be modified, namely any one of goods G1 to G13 (FIG. 10) displayed on the display device, by using the mouse.

Figure 13:
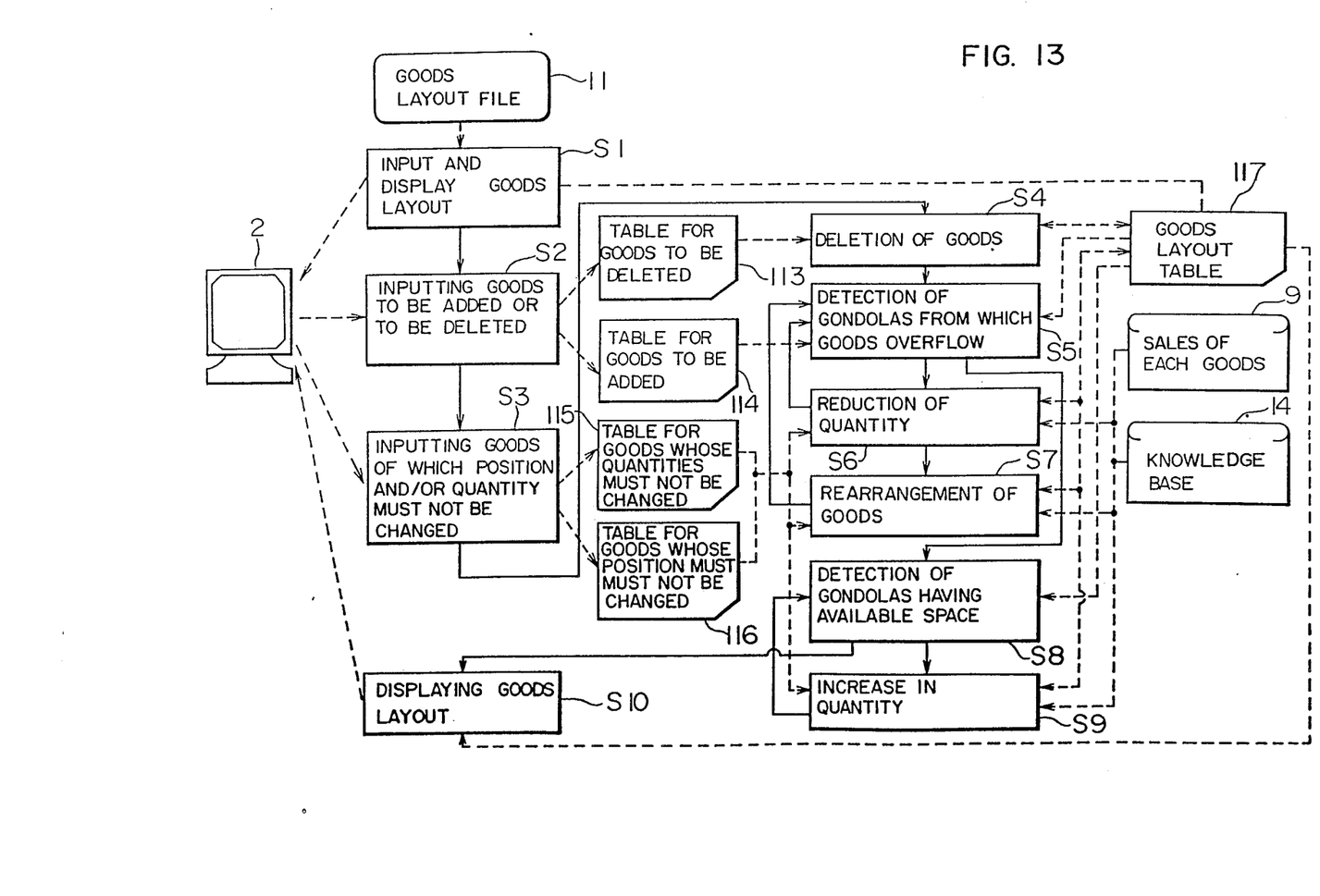
FIG. 13 is a block diagram showing an embodiment of a data processing system which is used to embody the layout managing method for goods according to the invention.

FIG. 13 shows an embodiment of an apparatus for performing a method of automatically determining a layout of goods according to the invention.

This embodiment is particularly effective to determine the quantity of goods and the rearrangement of the positions of the goods.

In the diagram, blocks S1 to S10 show functions in respective steps which are executed by the processor. Solid line arrows connecting the blocks indicate the processing order. Dotted line arrows indicate the flow of data.

Blocks 9, 11, and 14 denote the file for sales of each of the goods, goods layout file, and knowledge base regarding the goods layout which are stored in the memory. The contents of these blocks will be described in detail hereinafter.

Reference numeral 2 denotes the terminal device including the display device, a pointing device (e.g., a mouse, a light pen, or the like) to designate a display position on the display device, and a keyboard having data input or operating keys.

Further, blocks 113 to 117 represent various kinds of tables which are formed during the above processing steps. These tables are formed in the memory.

The operation in each processing step will now be described in detail hereinbelow.

Figure 14:
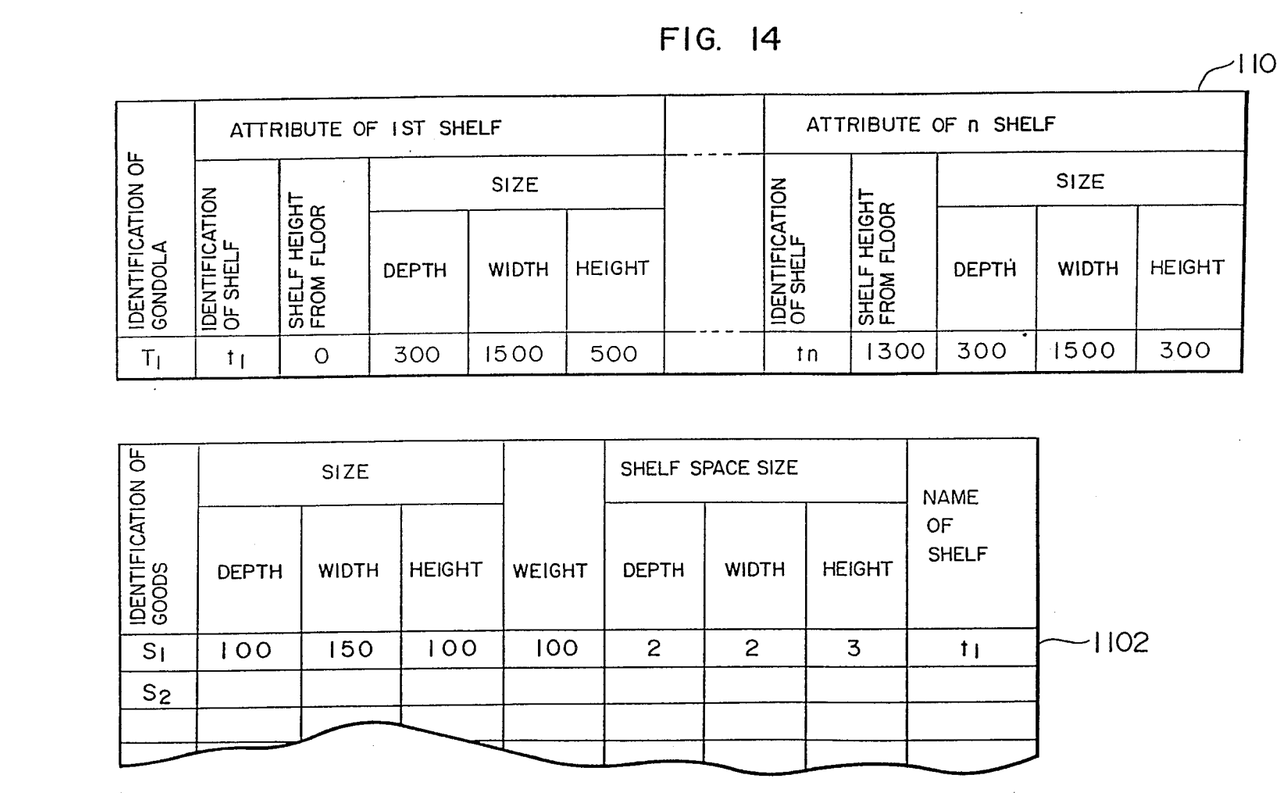
FIG. 14 is a diagram showing the contents of goods layout file 11 and goods layout table 117 in FIG. 13.

STEP 1: Input and display of goods layout (S1):

An attribute 1101 of a gondola and an attribute 1102 of goods shown in FIG. 14 are taken out of the goods layout file 11 and stored in the goods layout table 117 in the same form. Further, goods layout 1201 is outputted to the display device of terminal device 2 in a form shown in FIG. 15.

The identification of a gondola, and the identification, height from the floor surface, and size (depth, width, and height) of each shelf of the gondola are stored in the gondola attribute 1101. The identification of goods, size of goods (depth, width, and height), weight, shelf space size (depth, width, height), and identification of shelf are stored in the goods attribute 1102.

Figure 15:
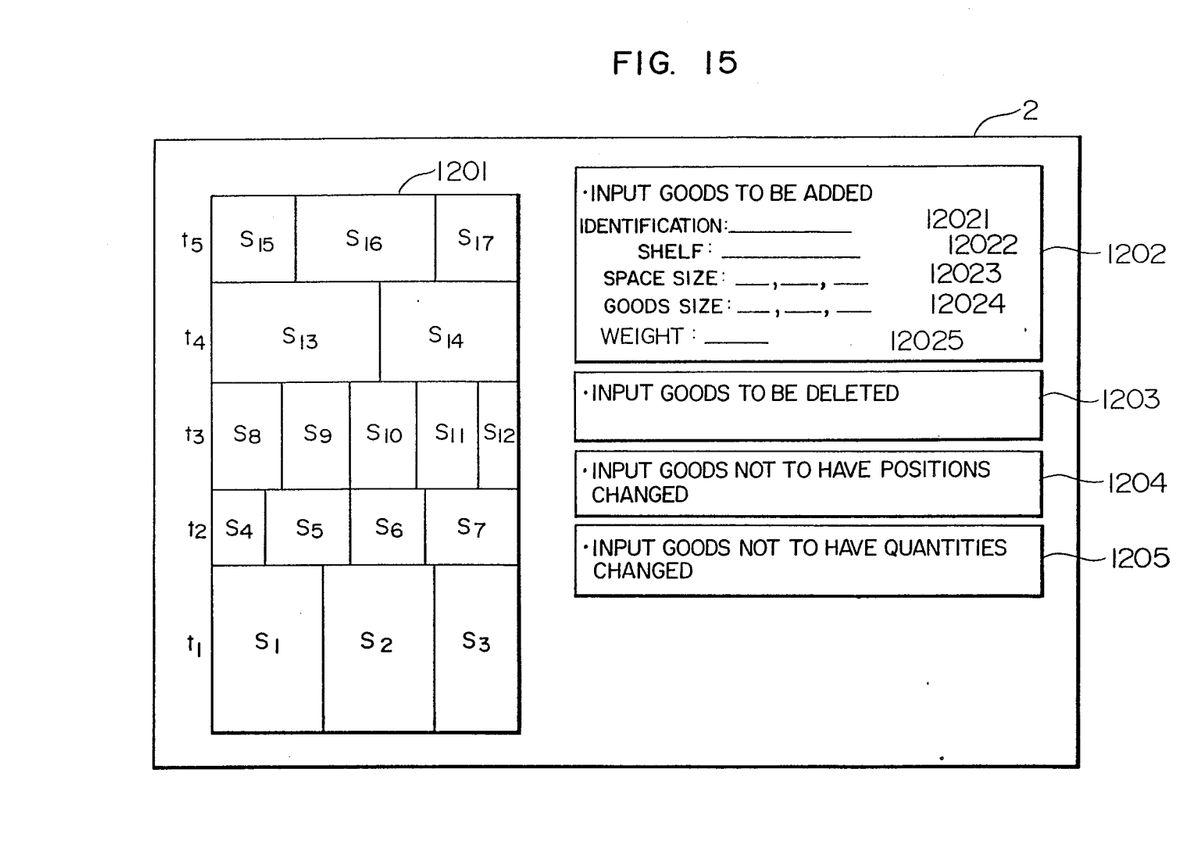
FIG. 15 depicts diagrams on a display screen of a layout of goods, goods to be added, goods to be deleted, goods whose quantity must not be changed, and goods whose position must not be changed which are displayed on a terminal device 2.
Figure 16:
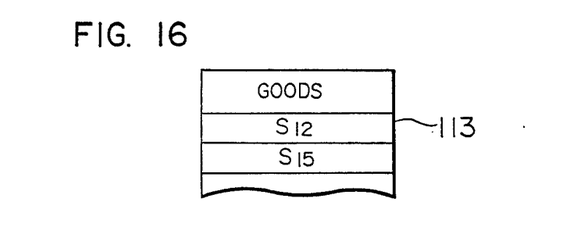
FIG. 16 is a diagram showing the contents of a table 113 for goods to be deleted.
Figure 17:
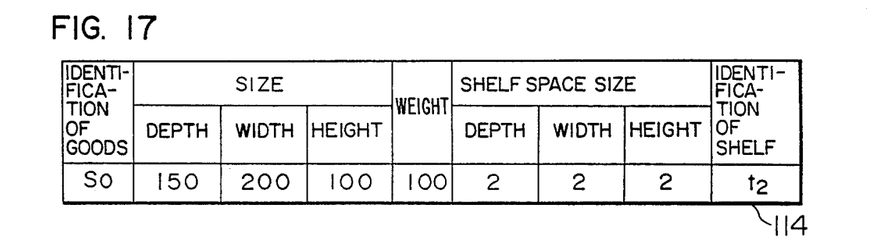
FIG. 17 is a diagram showing the contents of a table 114 for goods to be added.

STEP 2: Reception of goods to be added/deleted (S2):

As shown on the right side in FIG. 15, a screen 1202 listing the goods to be added is displayed. The user or planner inputs the identification of goods to be added into an input column 12021, the identification of the shelf into an input column 12022, the shelf space size into an input column 12023, the size of goods to be added into an input column 12024, and the weight of goods to be added into an input column 12025, respectively. In the inputting step (S2) of goods to be added or deleted, the inputted information is received and stored in a table 114 for goods to be added in a form shown in FIG. 17. A screen 1203 listing goods to be deleted is displayed. The user or planner designates the goods to be deleted from among the goods displayed on the goods layout screen 1201 by using the input device such as a mouse, a light pen, or the like. In the inputting step (S2) of goods to be added or deleted, the designated goods to be deleted are inputted. The identification of the inputted goods is stored in a table 113 of goods to be deleted in a form shown in FIG. 16.

Figure 18:
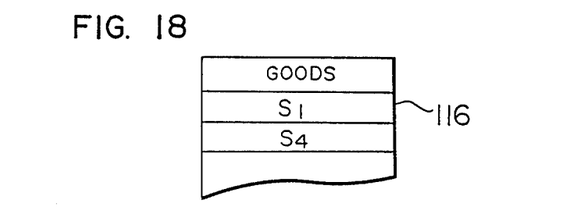
FIG. 18 is a diagram showing the contents of a table 116 for goods whose positions must not be changed.

STEP 3: Input of goods whose position or quantities must not be changed (S3):

A screen 1204 listing goods whose positions must not be changed is outputted to the display device of the terminal device 2. The user designates goods whose positions must not be changed from among the goods displayed on the goods layout screen 1201 by using the input device such as a mouse, a light pen, or the like. In the inputting step (S3) of goods whose positions must not be changed, the designated goods are inputted, and the identification of the inputted goods is stored in a form shown in FIG. 18 in a table 116 for goods whose positions must not be changed.

Figure 19:
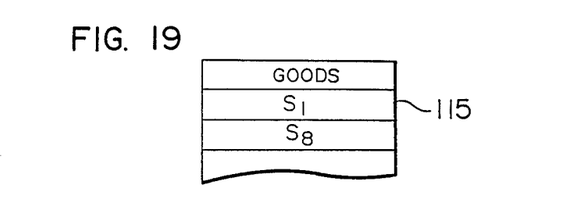
FIG. 19 is a diagram showing the contents of a table 115 for goods whose quantities must not be changed.

A screen 1205 for goods whose quantities must not be changed is displayed. The goods whose quantities must not be changed are inputted in the same method as mentioned above. The identifications of the goods whose quantities must not be changed are stored in a table 115 for goods whose quantities must not be changed in a form shown in FIG. 19.

STEP 4: Deletion of goods (S4):

The attribute of goods having the same identification as that of the goods stored in the table 113 for goods to be deleted is deleted from goods layout table 117.

STEP 5: Detection a shelf from which goods overflow (S5):

The goods having the same shelf identification are retrieved from the goods stored in the goods layout table 117 and table 114 for goods to be added. A check is made to see whether the following condition is satisfied or not:

"Width of shelf $\geq \sum_{i=1}^{N}$ (width of goods $i \times$ quantity in the width direction of the goods $i$)", where N = set of goods having the same shelf identification.

Any shelf which does not satisfy this condition is a shelf from which goods overflow. If all of the shelves satisfy this condition, the processing routine advances to step S8.

STEP 6: Reduction of goods (S6):

The quantity of goods on a shelf having overflowing goods, which is determined in step S5, is reduced by executing the following steps.

Figure 20:
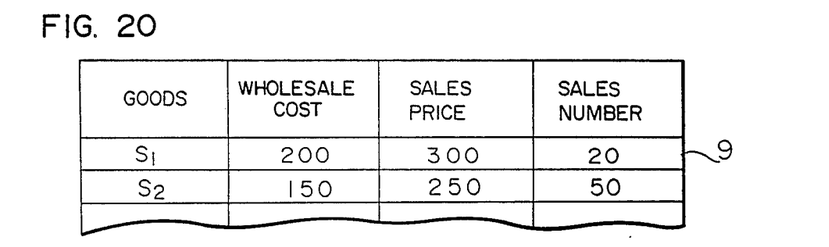
FIG. 20 is diagram showing the contents of a file 118 for sales date for each of the goods.

STEP S6-1: Retrieving characteristics of goods:

The wholesale cost and sales price of each of the goods and the quantity of the goods sold, which are stored in file 9 in a form depicted in FIG. 20, are retrieved. The amount of sales and amount of profit for each of the goods are calculated by the following equations:

"Amount of sales = sales price × the quantity of the goods sold", and

"Amount of profit = (sale price − wholesale cost) × the quantity of goods sold".

High and low threshold values are predetermined according to the amount of sales and the amount of profit, respectively. The characteristics of goods are retrieved on the basis of these threshold values. For example, if both the sales amount and the profit amount are at a high level, the goods are regarded as goods which can provide large profits. If the sales amount is at a high level and the profit amount is at a middle level, the goods are determined to be the goods which are frequently sold. In this manner, the characteristics of goods are determined.

Further, with respect to the size and weight of goods, threshold values are predetermined, thereby giving characteristics such as that the goods are long or short, heavy or light.

Figure 21:
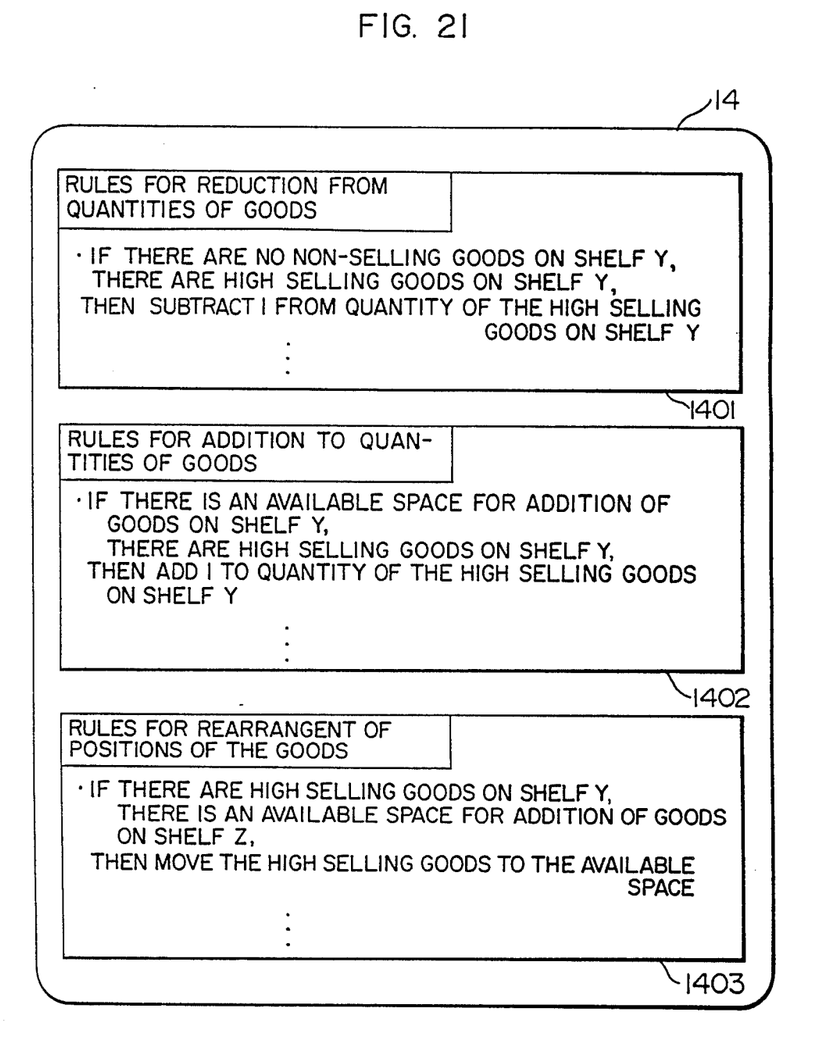
FIG. 21 is a diagram showing an example of a knowledge base 14.

STEP S6-2: Determining alternatives:

In this step, alternatives regarding which goods and how many of the goods should be deleted are determined utilizing the deletion rule 1401 of FIG. 21. The "if" section of the rule coincides with the characteristics retrieved in step S6-1 for each of the goods, as stored in the knowledge base 14. The "then" section of this rule is used to determine alternatives. However, the goods shown in the alternatives must not be goods stored in the table 115 for goods whose quantity must not be changed.

STEP S6-3: Reduction of quantity and evaluation of the reduction:

The goods whose sales price is the lowest are selected from the goods set forth in the alternatives. A quantity of these goods is reduced by the quantity shown in the alternatives.

The above operations are repeated until the overflow of goods is eliminated. Once the overflow of goods is eliminated, the result of the operation is stored in the goods layout table 117.

The overflowing of goods cannot be always eliminated by repeating the processes of steps S6-1 to S6-3. In this case, step S7 follows.

STEP 7: Rearrangement of goods (S7):

For the shelf for which the overflowing of goods could not be eliminated in step S6, the goods are rearranged (S7) by executing the following steps.

STEP 7-1: Retrieving characteristics of goods and gondola:

The characteristics of each of the goods are retrieved in the same manner as in step S6-1.

Further, a threshold value is predetermined according to the width of the available space for addition of goods on the shelf. This characteristic is set such that the shelf is long or short by using the threshold value as a reference value.

STEP S7-2: Determining alternatives:

In this step, the alternatives regarding to which shelf which goods should be moved are determined, utilizing the rearrangement rule 1403 of FIG. 21. The "if" section of the rule coincides with the characteristics retrieved in step S7-1 for the position of each of the goods as stored in the knowledge base 14. The "then" section of this rule is used to determine the alternatives. However, the goods shown in the alternatives must not be goods stored in the table 116 for goods whose positions must not be changed.

STEP S7-3: Rearrangement and evaluation of the rearrangement:

The goods which coincide with (or which are closest to) the available space for addition of goods on the shelf are selected from the goods set forth in the alternatives. These goods are rearranged in accordance with the alternatives.

The foregoing operations are repeated until the overflowing of goods is eliminated. If the overflowing of goods is eliminated, the result of the above operation is stored in the goods layout table 117, and the processing routine advances to step S5.

STEP 8: Detection of shelf having available space (S8):

The goods having the same shelf identification are retrieved from among the goods stored in the goods layout table 117. A check is made to see whether the following condition is satisfied or not:

"Width of shelf $\geq \sum_{i=1}^{N}$ (width of goods $i$ × quantity in the width direction of the goods $i$)", where N = set of goods having the same shelf identification.

A shelf which satisfies this condition is a shelf having available space. If all of the shelves do not satisfy this condition, step S10 follows.

STEP 9: Increase in quantity (S9):

For a shelf having available space, as detected in step S8, the quantity of goods on the shelf is increased by executing the following steps.

STEP S9-1: Retrieving characteristics of the goods and of the available space on shelves:

The characteristics of the goods and of the available space on shelves are retrieved in the same manner as in step S7-1.

STEP S9-2: Determining alternatives:

In this step, the alternatives regarding which goods and how many of the goods can be increased are determined utilizing the addition rule 1402 of FIG. 21. The "if" section of the rule coincides with the characteristics retrieved in step S9-1 for each of the goods stored in the knowledge base 14. The "then" section of this rule is used to determine the alternatives. However, the goods shown in the alternatives must not be goods stored in the table 115 for goods whose quantity must not be changed.

STEP S9-3: Increase of quantity and evaluation of the increase:

The goods whose sales price is the highest are selected from the goods set forth in the alternatives, and the quantity of these goods is increased by the quantity shown in the alternatives.

The foregoing operations are repeated until no more of the goods can be arranged in the available space. The result of the above operation is stored in the goods layout table 117.

The above processes in steps S8 and S9 are repeated until unused space on the shelf is eliminated.

STEP S10: Display of goods layout (S10):

The goods layout screen 1201 (FIG. 15) is displayed on the display device of terminal device 2 on the basis of the attribute 1102 of the goods and the attribute 1101 of the shelf (FIG. 14) as stored in table 117.

According to the embodiment, by merely inputting a plan for the goods layout such as "to which position which goods should be added" or "which goods should be deleted", the quantity of each of the goods and the rearrangement of the positions of each of the goods can automatically be determined. The trial number of plans required of the user can be reduced. Thus, the number of operators to make layout plans for the goods can be reduced, and the efficiency in the layout planning work can be increased.

We claim:

1. A method of determining a goods layout on gondolas in a store, said method comprising the steps of:
   (a) displaying on a display screen of a display device sales data for each of the goods on each gondola in the store based on information in a floor layout file having stored therein layout information about the gondolas in the store, a goods layout file having stored therein layout information about the goods on each gondola in the store, and a sales file having stored therein sales data for each of the goods on each gondola in the store, thereby permitting determination of whether there exists a gondola whose layout of goods should be modified;
   (b) designating a gondola determined as a result of step (a) as a gondola whose layout of goods should be modified, and displaying on the display screen a goods layout of the goods on the designated gondola, based on information stored in the goods layout file and sales data for each of the goods on the designated gondola, based on information stored in the sales file, thereby permitting determination of goods to be deleted from or added to the designated gondola;
   (c) designating goods determined in step (b) to be deleted from or added to the designated gondola; and
   (d) automatically determining a new goods layout for the designated gondola, based on information in the goods layout file and the sales file and knowledge in a knowledge base of rules for determining a goods layout based on characteristics of goods.

2. A method according to claim 1, further including the step of:
   (a) modifying the goods layout determined in step (d) in a man-machine interactive manner permitting a user to designate modifications to the determined goods layout.

3. A method according to claim 1, wherein step (a) includes displaying a layout of the gondolas in the store and a total amount of sales of goods from each gondola, and step (b) includes displaying a goods layout and sales data for the goods on each shelf of the designated gondola.

4. A method of determining a goods layout for a store, said method comprising the steps of:
   (a) displaying a layout of goods on a gondola on a display screen of a display device, based on goods layout information about the store;
   (b) inputting to a data processor to which the display device is connected the identification of goods to be deleted from or added to the gondola, goods on the gondola whose quantities must not be changed, and goods on the gondola whose positions must not be changed;
   (c) adding or deleting information about the identified goods to or from the goods layout information and detecting on the gondola shelves overflowing with goods and shelves having available space as a result of such addition or deletion of goods;
   (d) determining alternatives regarding to which shelf of the gondola which goods should be moved and the quantities of which goods should be increased or decreased, based on the goods layout information resulting from step (c), the identification of goods whose quantities or positions must not be changed, and rules in a knowledge base with respect to the increase/decrease in quantities of goods and the rearrangement of the positions of goods; and
   (e) selecting an appropriate layout of the goods from among the goods layouts resulting from the determined alternatives.

5. A method of determining a goods layout on gondolas in a store, comprising the steps of:
   displaying a floor layout of gondolas in the store, based on information about the position and size of each of the gondolas in the store;
   displaying sales data for the goods on each of the gondolas in the store based on stored sales data for the goods;
   selecting a gondola on which the layout of goods is to be modified by modifying the positions and/or quantities of the goods on the gondola;
   displaying a goods layout for the shelves of the selected gondola based on information about the positions and quantities of goods on the selected gondola;
   displaying sales data for the goods on each of the shelves of the selected gondolas based on sales data for the goods;
   selecting goods whose positions and/or quantities are to be modified on the selected gondola;
   inputting an increase/decrease number for the selected goods;
   determining a new goods layout for the shelves of the selected gondola on which the selected goods are positioned based on a knowledge base having rules for determining a new goods layout, information showing sizes of the shelves and of the goods, and the inputted increase/decrease number for the selected goods; and
   displaying the new goods layout for the shelves of the selected gondola.

6. A method according to claim 5, further comprising the steps of:
   inputting identification of goods whose positions and/or quantities must not be changed; and determining the new goods layout based additionally on the identified goods.

7. A method of determining a new goods layout, for shelves in a store, by using information regarding the goods layout for the shelves, the size and position of each shelf, and sales data for goods, said method comprising the steps of:
- outputting the goods layout of the shelves and the sales data for the goods;
- selecting goods whose layout should be modified;
- determining a new goods layout for the said shelves on which the selected goods are positioned based on the outputted information and a knowledge base including rules for determining an appropriate goods layout; and
- outputting the new goods layout for the shelves.

8. An apparatus for determining a new goods layout for shelves of gondolas in a store, comprising:
- a memory for storing data showing a gondola layout of the store including the position and size of each of the gondolas in the store and the position and size of each of the shelves on each of the gondolas, an existing goods layout of the store including the size, position and quantity of each of the goods on the shelves of the gondolas in the store, and sales data for the goods;
- selecting means for selecting a gondola and goods on the shelves of the selected gondola whose positions and/or quantities are to be modified;
- an input device for inputting an increase/decrease number for the selected goods;
- a knowledge base including rules for a goods layout;
- determining means for determining a new goods layout for the shelves of the selected gondola based on the gondola layout, the existing goods layout, the sales data, the inputted increase/decrease and the rule and
- an output device for displaying the gondola layout of the store, the existing goods layout, the sales data and the new goods layout.

9. An apparatus according to claim 8, wherein said memory further stores an identification of goods whose positions and/or quantities must not be changed.

10. A method as claimed in claim 7, wherein the outputted goods layout includes identification of goods whose positions and/or quantities must not be changed.

* * * * *